(12) United States Patent
Westerdahl et al.

(10) Patent No.: US 8,206,532 B2
(45) Date of Patent: Jun. 26, 2012

(54) METHOD AND TOOL FOR FORMING AN ELONGATE, HOLLOW ARTICLE OF A FIBER-REINFORCED COMPOSITE MATERIAL

(75) Inventors: Anders Westerdahl, Linköping (SE); Jan-Ole Brewler, Linköping (SE); Ingemar Turesson, Linköping (SE)

(73) Assignee: Saab AB, Linköping (SE)

( * ) Notice: Subject to any disclaimer, the term of this patent is extended or adjusted under 35 U.S.C. 154(b) by 86 days.

(21) Appl. No.: 12/238,581

(22) Filed: Sep. 26, 2008

(65) Prior Publication Data

US 2009/0107619 A1 Apr. 30, 2009

(30) Foreign Application Priority Data

Sep. 26, 2007 (EP) .................................. 07117229

(51) Int. Cl.
*B65H 81/00* (2006.01)
*B29C 53/56* (2006.01)
(52) U.S. Cl. ........ 156/173; 156/169; 156/184; 156/189; 156/190; 156/195
(58) Field of Classification Search .................. 156/173, 156/187, 184, 189, 190, 195, 169; 425/384, 425/392, 393; 264/635
See application file for complete search history.

(56) References Cited

U.S. PATENT DOCUMENTS

| | | | | |
|---|---|---|---|---|
| 2,794,481 A * | 6/1957 | Anderson | ...................... | 156/163 |
| 3,023,135 A * | 2/1962 | Wiltshire | ...................... | 343/872 |
| 3,115,271 A * | 12/1963 | Anderson et al. | ............. | 343/872 |
| 4,110,396 A * | 8/1978 | Reynolds | ...................... | 264/236 |
| 4,997,503 A * | 3/1991 | Bohannan et al. | ............ | 156/195 |
| 5,779,838 A * | 7/1998 | Fellers et al. | .................. | 156/195 |

FOREIGN PATENT DOCUMENTS

| | | |
|---|---|---|
| EP | 1260349 A2 | 11/2002 |
| EP | 1260349 A3 | 12/2003 |
| JP | 60212331 A | 10/1985 |
| JP | 61014938 A | 1/1986 |

OTHER PUBLICATIONS

European Search Report—Mar. 28, 2008.

* cited by examiner

*Primary Examiner* — Khanh P Nguyen
*Assistant Examiner* — Carson Gross
(74) *Attorney, Agent, or Firm* — Venable LLP; Eric J. Franklin

(57) ABSTRACT

In a method and a tool for forming an elongate, hollow article of a fiber-reinforced composite material one end of an article laminate applied to a tool bar is placed in engagement with or is supported by an anvil of the tool so as to control the direction of longitudinal movement of the cured article relative to the tool bar during the cooling and dismantling phase.

9 Claims, 1 Drawing Sheet

METHOD AND TOOL FOR FORMING AN ELONGATE, HOLLOW ARTICLE OF A FIBER-REINFORCED COMPOSITE MATERIAL

CROSS-REFERENCE TO RELATED APPLICATIONS

This application claims priority to European patent application 07117229.0 filed 26 Sep. 2007.

BACKGROUND OF THE INVENTION

1. Field of the Invention

The present invention relates generally to a method for forming an elongate, hollow article of a fiber-reinforced composite material.

The invention also relates to a tool for forming an elongate, hollow article of a fiber-reinforced composite material, comprising an elongate, metallic tool bar having a first end and a second end.

2. Description of Related Art

When forming elongate, hollow articles of fiber-reinforced composite material, such as hollow beams or the like for the aircraft manufacturing industries, a metallic core or bar is often used as a mandrel or tool, around which a plurality of layers of a resin-impregnated tape (so called "prepreg") is applied by winding it in an overlapping manner to form a laminated, semi-finished article. After curing of this composite article in a subsequent heat-treatment step, e.g. in an oven or autoclave, the cured article is cooled together with the tool bar. In the cooling phase, normally in room temperature, the tool bar shrinks to a certain degree, i.e. the cross-sectional area and the length of the tool bar is somewhat reduced, whereas the dimensions of the cured article remain substantially unchanged. In some cases, especially where the article and the tool bar is slightly curved in one or two directions and has a lengthwise tapered configuration, the shrinkage of the tool bar may cause undesired engagement between the tool bar and the cured article at certain locations along the tool bar due to uncontrolled mutual longitudinal movements of the tool bar and the article during the cooling phase. This may irrevocably damage the article at certain locations when dismantling the same from the tool bar.

SUMMARY OF THE INVENTION

It is a primary object of the present invention to provide an improved method for forming an elongate, hollow article of a fiber-reinforced composite material which eliminates the above-mentioned drawback of the prior art methods. Owing to the arrangement of the uncured article laminate on the tool bar such that during the heat-treatment and the cooling phases one end of the laminate engages a support surface or is supported by a support surface of an anvil fixed to the tool bar, the direction of movement of the cured article relative to the tool bar can be controlled to be in only one suitable longitudinal direction which does not affect the cured article.

According to another aspect of the invention there is provided a specific tool for carrying out the method of the invention, i.e. for forming an elongate, hollow article of a fiber-reinforced composite material, which ensures a controlled longitudinal movement of the cured article relative to the tool bar during the shrinkage phase thereof and a subsequent damage-free dismantling of the cured article from the tool bar.

Further details of the method and the tool of the invention will be described in the following detailed description with reference to the accompanying drawing.

DETAILED DESCRIPTION OF A PREFERRED EMBODIMENT

Figure 1:
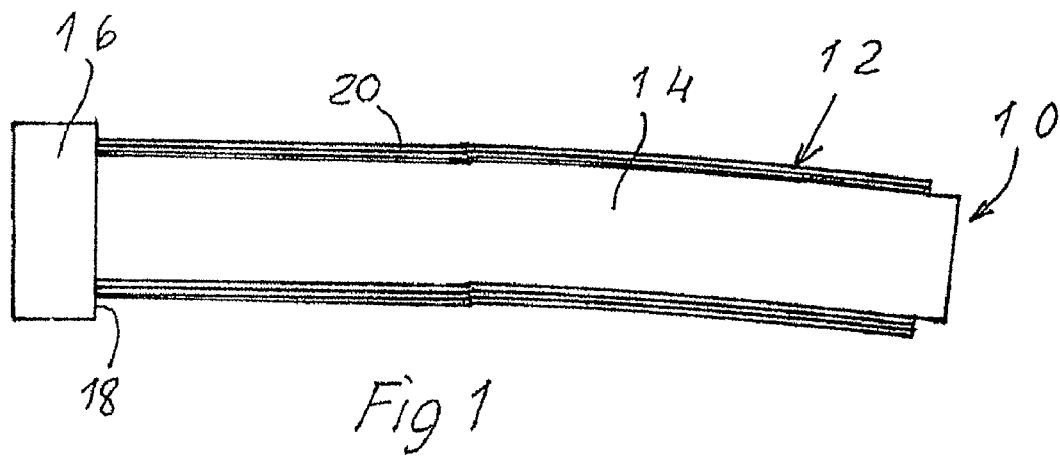
FIG. 1 is a side view of a tool bar with a prepreg laminate applied thereto, in a heated condition when curing the laminate.
Figure 2:
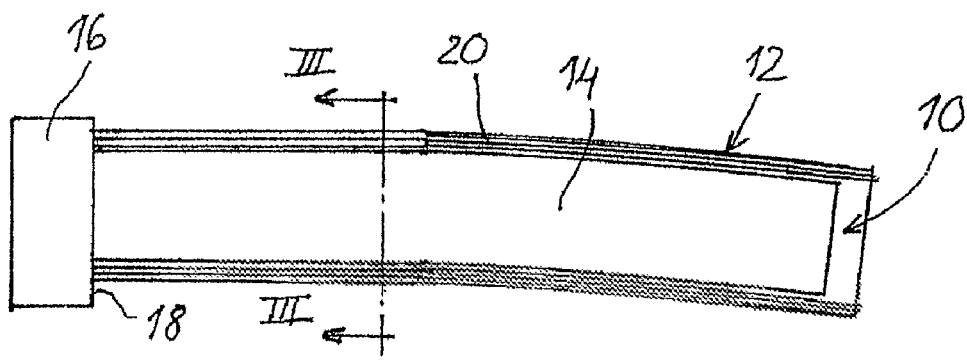
FIG. 2 is side view similar to FIG. 1 of the tool bar and the laminate in a cooled condition after the curing step, showing in an exaggerated manner the shrinkage of the tool bar.
Figure 3:
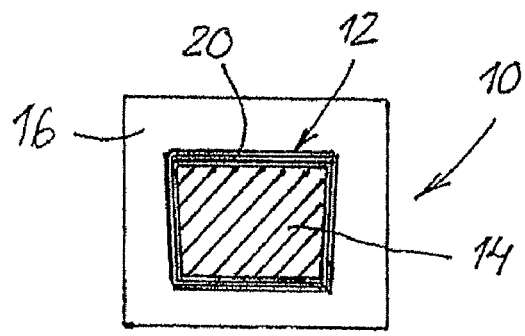
FIG. 3 is a cross sectional view of the tool bar and the laminate, taken along the line III-III in FIG. 2.

FIGS. 1-3 illustrate a tool 10 for forming an elongate, hollow article 12 of a fiber-reinforced composite material, such as a hollow beam or the like for the aircraft manufacturing industries. The tool 10 includes an elongate, preferably solid core or bar 14 having a cross-section corresponding to that of the inner space of the article 12 to be formed, and an anvil 16 at one end of the bar 14. The anvil 16 is preferably formed integral with the bar 14 in a metallic material. Furthermore, the anvil 16 has a radial surface 18 facing the article 12 of fiber-reinforced composite material and defining, as will be explained hereinafter, a support surface for engagement with or supporting an inner end of the article 12 being formed. The bar 14 may have a constant cross-section or have a slightly tapered configuration from said one end thereof towards its other end and may be curved in at least in one lateral direction. For example, as shown in FIG. 3, the cross-section of the article 12 and thus of the tool bar 14 may be trapezoidal or have any other arbitrary configuration.

In manufacturing for example an elongate hollow beam for an inner support structure of an aircraft control surface a plurality of layers 20 of resin-impregnated fiber-reinforced web material ("prepreg") are applied on the tool bar 14, e.g. by a tape-laying machine (not shown) winding overlapping layers 20 around the tool bar 14. The inner end of the laminated, uncured article 12 is placed in engagement with the radial support surface 18, is supported by the radial support surface 18 or is lying against the radial support surface 18 of the anvil 16. Then, the tool 10 and the uncured article 12 is heated in an oven or an autoclave (not shown) in order to cure the article 12 on the tool bar 14.

After the curing step the tool 10 and the cured article 12 are allowed to cool in room temperature. As shown exaggerated in FIG. 2, the tool 10 will shrink somewhat laterally and longitudinally relative to the cured article 12 in the cooling phase. Due to the fact that the inner end of the cured article 12 is in contact with the support surface 18 of the anvil 16, the longitudinal movement of the cured article 12 relative to the tool bar 14 will be positively controlled to be executed in only one direction during the cooling and dismantling phase of the article 12. This will prevent possible damage to the article 12 caused by a squeezing action between the tool bar 14 and the article 12, when the tool bar 14 shrinks in two opposite longitudinal directions relative to the article 12. Thus, in the cooling phase the support surface 18 of the anvil 16 at one end of the tool bar 14 will push the article 12 in one single direction relative to the tool bar 14, or, in other words, the tool bar 14 will shrink in one single longitudinal direction relative to the article 12 (to the left in FIG. 2).

Further, the present invention relates to the use of the tool 10 described above, which has an elongate, metallic tool bar 14 with a first end and a second end, wherein the tool bar 14 is provided with an anvil 16 at the first end thereof, said anvil 16 having a fixed surface 18 protruding radially from the tool bar 14 for forming an article of a fiber-reinforced composite material by the steps of:

applying at least one layer 20 of a resin-impregnated tape around the tool bar 14 so as to form an uncured article 12 thereon, one end of which is engaged with or is supported by a support surface 18 of the fixed anvil 16, heating the article 12 on the tool bar 14 for curing the article, and dismantling the cured, cooled article 12 from the tool bar 14 in a direction away from the first end towards the second end of the tool bar 14.

The invention claimed is:

1. A method for forming an elongate, hollow article of a fiber-reinforced composite material, the method comprising:
   providing an elongate, metallic tool bar comprising a first end and a second end and having a fixed anvil at said first end of the tool bar,
   applying at least one layer of a resin-impregnated fiber-reinforced web material around the tool bar so as to form an uncured article thereon, wherein one end of the uncured article engages a support surface or is supported by the support surface of the fixed anvil,
   heating the article on the tool bar for curing the article,
   cooling the cured article on the tool bar, wherein the tool shrinks laterally and longitudinally relative to the cured article during the cooling, and
   dismantling the cured, cooled article from the tool bar by moving the cured, cooled article in a direction away from the first end towards the second end of the tool bar, wherein the support surface of the fixed anvil controls a direction of longitudinal movement of the cured article relative to the tool bar during the cooling and the dismantling.

2. The method according to claim 1, wherein applying resin-impregnated web material around the tool bar comprises applying a plurality of overlapping layers thereon.

3. The method according to claim 1, further comprising:
   providing the anvil with a fixed surface protruding radially from the tool bar for for supporting an inner end of the article being formed on the tool bar.

4. The method according to claim 3, further comprising:
   orienting the anvil support surface substantially perpendicular to a longitudinal axis of the tool bar.

5. The method according to claim 3, further comprising:
   providing the tool bar with a tapered configuration from the first end towards the second end.

6. The method according to claim 3, further comprising:
   curving the tool bar in at least in one direction.

7. The method according to claim 3, further comprising:
   making the anvil integral with the tool bar.

8. A method for forming an article of a fiber-reinforced composite material using a tool comprising an elongate, metallic tool bar comprising a first end and a second end, wherein the tool bar further comprising an anvil at the first end thereof, said anvil having a fixed surface protruding radially from the tool bar, the method comprising:
   applying at least one layer of a resin-impregnated fiber-reinforced web material around the tool bar so as to form an uncured article thereon, wherein one end of the uncured article is engaged or is supported by a support surface of the fixed anvil,
   heating the article on the tool bar to cure the article,
   cooling the cured article on the tool bar, wherein the tool shrinks laterally and longitudinally relative to the cured article during the cooling, and
   dismantling the cured, cooled article from the tool bar by moving the cured, cooled article in a direction away from the first end towards the second end of the tool bar, wherein the support surface of the fixed anvil controls a direction of longitudinal movement of the cured article relative to the tool bar during the cooling and the dismantling.

9. The method according to claim 8, further comprising:
   applying resin-impregnated web material around the tool bar includes applying a plurality of overlapping layers thereon.

* * * * *